(12) United States Patent
Kitson et al.

(10) Patent No.: US 9,519,199 B2
(45) Date of Patent: Dec. 13, 2016

(54) REFLECTIVE STRUCTURE WITH TRANSPARENT AND SEMI-TRANSPARENT TRANSMISSION REGIONS

(71) Applicant: HEWLETT-PACKARD DEVELOPMENT COMPANY, L.P., Houston, TX (US)

(72) Inventors: Stephen Kitson, Bristol (GB); Adrian Geisow, Bristol (GB); Timothy Taphouse, Bristol (GB); Mario Ariosto Matranga, Bristol (GB); Gary George Wells, Bristol (GB); Jessica Louise Boland, Bristol (GB); Sarwat Amreen Baig, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/421,287

(22) PCT Filed: Sep. 27, 2012

(86) PCT No.: PCT/US2012/057644
§ 371 (c)(1),
(2) Date: Feb. 12, 2015

(87) PCT Pub. No.: WO2014/051594
PCT Pub. Date: Apr. 3, 2014

(65) Prior Publication Data
US 2015/0212384 A1    Jul. 30, 2015

(51) Int. Cl.
*G02F 1/03*    (2006.01)
*G02F 1/07*    (2006.01)
(Continued)

(52) U.S. Cl.
CPC . *G02F 1/19* (2013.01); *B44F 1/04* (2013.01); *B44F 1/066* (2013.01); *G02B 27/144* (2013.01)

(58) Field of Classification Search
CPC ... G02B 6/0055; G02B 6/0051; G02B 5/0284; G02B 5/0289
(Continued)

(56) References Cited

U.S. PATENT DOCUMENTS 3,661,686 A    5/1972    Armstrong
5,591,527 A    1/1997    Lu
(Continued)

FOREIGN PATENT DOCUMENTS

JP    2009-109994    5/2009
JP    2012-018424    1/2012
(Continued)

OTHER PUBLICATIONS

International Search Report, Apr. 29, 2013, PCT Patent Application No. PCT/US2012/057644. 10 pages.
(Continued)

*Primary Examiner* — Mahidere Sahle
(74) *Attorney, Agent, or Firm* — HP Inc. Patent Department

(57) ABSTRACT

A reflective structure with transparent and semi-transparent transmission regions and includes a first transparent layer with a textured area, a reflective layer disposed below the first transparent layer and having a portion that is substantially conformal with at least a first portion of the textured area, and a second transparent layer disposed below the reflective layer and having a portion with a refractive index that is substantially equal to a refractive index of the first transparent layer. The transparent transmission region is configured to transmit a portion of light without substantial deviation, and the semi-transparent transmission region is configured to transmit another portion of the light from the first transparent layer with substantial deviation.

9 Claims, 3 Drawing Sheets

(51) Int. Cl.
*G02F 1/19* (2006.01)
*G02B 27/14* (2006.01)
*B44F 1/04* (2006.01)
*B44F 1/06* (2006.01)

(58) Field of Classification Search
USPC .............................. 359/263, 599, 601–614
See application file for complete search history.

(56) References Cited

U.S. PATENT DOCUMENTS

| | | | |
|---|---|---|---|
| 5,661,600 | A | 8/1997 | Mitani et al. |
| 6,813,094 | B2 | 11/2004 | Kaminsky et al. |
| 7,587,117 | B2 | 9/2009 | Winston et al. |
| 2006/0114388 | A1 | 6/2006 | Power |
| 2008/0034628 | A1 | 2/2008 | Chnuck |
| 2009/0244413 | A1 | 10/2009 | Ishikawa et al. |
| 2010/0014164 | A1 | 1/2010 | O'Brien |
| 2010/0165660 | A1 | 7/2010 | Weber et al. |
| 2010/0177255 | A1 | 7/2010 | Tamir et al. |
| 2010/0265435 | A1 | 10/2010 | Hwang et al. |
| 2011/0310487 | A1 | 12/2011 | Nagahama et al. |
| 2012/0038868 | A1 | 2/2012 | Jun et al. |

FOREIGN PATENT DOCUMENTS

| | | |
|---|---|---|
| KR | 10-2002-0066747 | 8/2002 |
| WO | WO-2011092502 | 8/2011 |

OTHER PUBLICATIONS

Izadi, Shahram, et al. "Going beyond the display: a surface technology with an electronically switchable diffuser." Proceedings of the 21st annual ACM symposium on User interface software and technology. ACM, 2008.

Sincerbox, Glenn T. "Counterfeit deterrent features for the next-generation currency design." vol. 472. National Academies Press, 1993. http://www.nap.edu/openbook.php?record_id=2267&page=87.

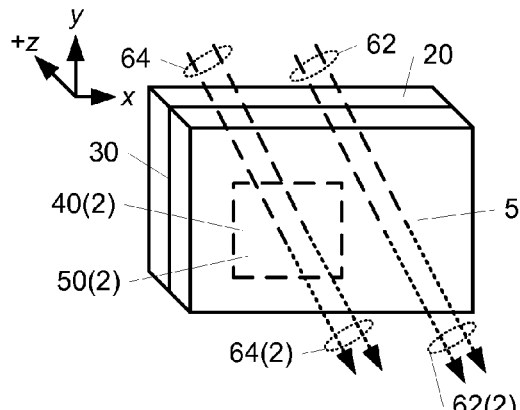
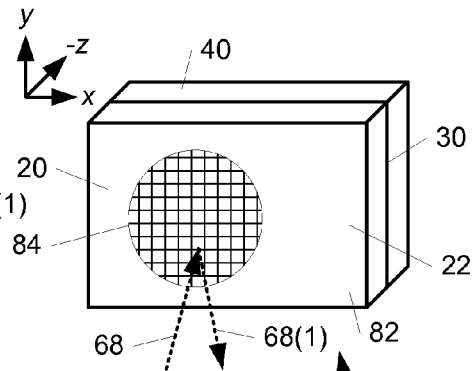
Fig. 5     Fig. 6
Fig. 7
Fig. 8A
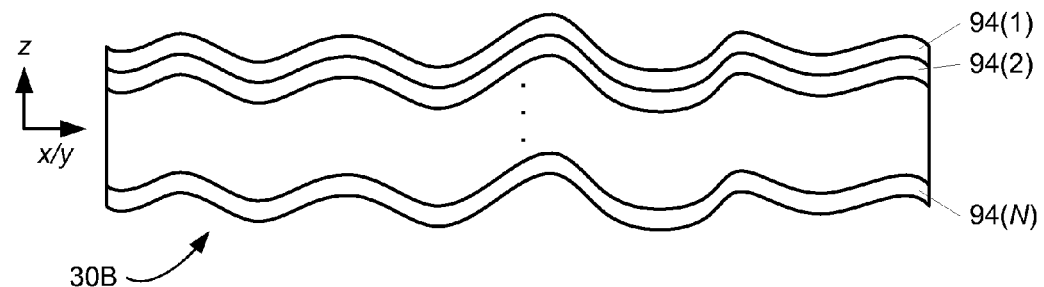
Fig. 8B ial products and articles. Surface structures may be formed of a single material, or may be formed of different materials, for example in a multilayer structure comprising layers of different materials. The appearance of products and articles, and, in particular, the visible surfaces thereof, under particular illumination conditions can be varied by the choice of a surface structure, including its configuration and materials, according to design requirements.

REFLECTIVE STRUCTURE WITH TRANSPARENT AND SEMI-TRANSPARENT TRANSMISSION REGIONS

BACKGROUND

Surface structures have a wide variety of applications. For example, such structures may be used for product casings or product surfaces or may otherwise be incorporated within decorative and utilitarian products and articles. Surface structures may be formed of a single material, or may be formed of different materials, for example in a multilayer structure comprising layers of different materials. The appearance of products and articles, and, in particular, the visible surfaces thereof, under particular illumination conditions can be varied by the choice of a surface structure, including its configuration and materials, according to design requirements.

BRIEF DESCRIPTION OF THE DRAWINGS

FIG. 5 is a schematic diagram illustrating a bottom perspective view of one example of a reflective structure with transparent and semi-transparent transmission regions where the semi-transparent transmission region is electrically switchable.

FIG. 6 is a schematic diagram illustrating a top perspective view of one example of a reflective structure with a pattern formed by specular and diffuse reflection areas.

FIG. 7 is a schematic diagram illustrating a side view of one example of a transparent layer.

FIGS. 8A-8B are schematic diagrams illustrating side views of examples of a reflective layer.

DETAILED DESCRIPTION

Figure 1:
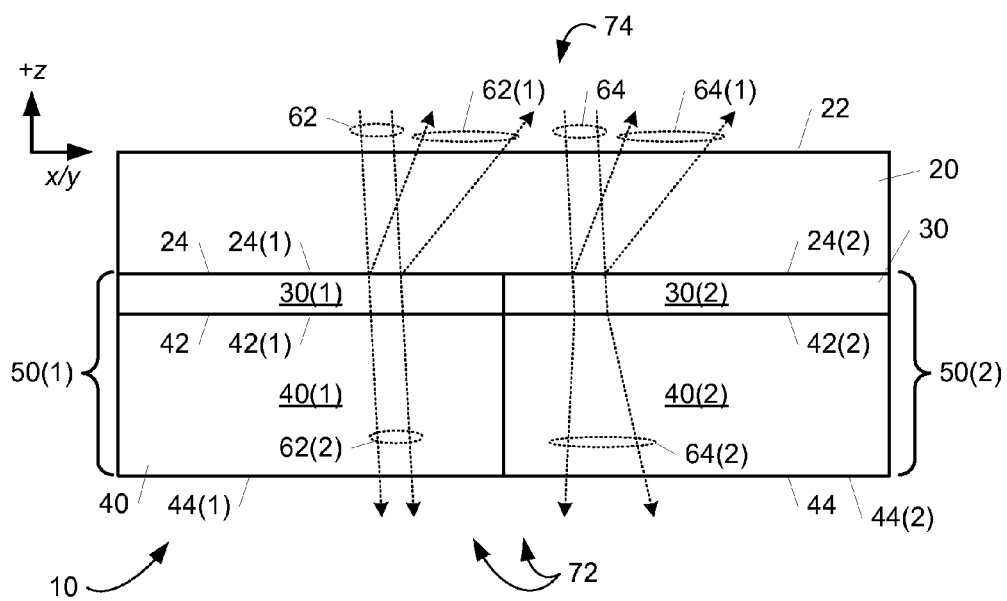
FIG. 1 is a block diagram illustrating a side view of one example of a reflective structure with transparent and semi-transparent transmission regions.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, a reflective structure that may be used to form a surface in a wide variety of product applications is provided. The structure is configurable to produce a desired appearance when viewed from one or more of its surfaces, for example under certain lighting or illumination conditions. Use of the structure as a visible surface of a decorative or utilitarian product or article, or a part thereof, enables the appearance of that surface to be selected, controlled or altered, in some cases dependent upon a particular illumination condition or lighting environment. Methods for manufacturing the structure are also disclosed.

As used herein, the term "transparent" means substantially transmissive of wavelengths, polarizations, and/or angles of incidence within a range of interest (e.g., visible light, colored light, infrared light, ultraviolet light, or selected polarizations and/or angles of incidence) and without substantial light deviation. The term "semi-transparent" means substantially transmissive of wavelengths, polarizations, and/or angles of incidence within a range of interest (e.g., visible light, colored light, infrared light, ultraviolet light, or selected polarizations and/or angles of incidence) and with substantial light deviation.

The term "light" means electromagnetic radiation having wavelengths in and around the visible spectrum, including ultraviolet and infrared wavelengths.

The term "colored light" means light having wavelengths within a particular color waveband within the visible spectrum. The red waveband generally corresponds to wavelengths of 580 to 650 nm, the green waveband generally corresponds to wavelengths of 490 to 580 nm, and the blue waveband generally corresponds to wavelengths of 400 to 490 nm. Colored light may have a broadband spectrum across wavelengths within the relevant waveband, but typically has a spectral profile with a peak wavelength at or around the center of the waveband (and thus also called "center wavelength"), for example a peak wavelength of 620 nm for red light, a peak wavelength of 535 nm for green light and a peak wavelength of 460 nm for blue light.

The term "white light" means light having a spectral profile across the visible spectrum, so that it is perceived as white by the human eye. Examples of white light include ambient light and light from an incandescent light source.

The term "textured", when used in relation to a surface/topography of a layer, means the local surface area normal to the layer (i.e., height) varies over lateral distance/area sufficiently quickly to diffuse, scatter or otherwise deviate the light it reflects over a defined angle range, but not so quickly as to diffract it. With a textured surface, the height of the surface is varying across distances of an order greater than optical wavelengths, but non-varying (i.e., smooth) across distances of the order of optical wavelengths. The term "smooth", when used in relation to a surface/topography of a layer, means the local surface area normal to the substrate does not vary over lateral distance/area so as to diffuse, scatter or otherwise deviate the light it reflects. With a smooth surface, the height of the surface is non-varying across distances of the order of optical wavelengths.

The term "conformal", when used in relation to a layer or stack of layers, means the thickness of the layer/layers, with respect to the surface on which it is formed, is substantially uniform (i.e., constant or only slowly varying over distance) so that transmitted light is not significantly diffused when the refractive indices on both sides of the layers/layers is substantially equal. The term "non-conformal", when used in relation to a layer or stack of layers, means the thickness of the layer/layers, with respect to the surface on which it is formed, is substantially non-uniform (i.e., non-constant or quickly varying over distance) so that transmitted light is significantly diffused.

Terms such as "above", "below", "top", "bottom" are used merely to indicate the relative position of features of the described structure as illustrated in the drawings and do not necessary signify the orientation of such features or structure in an implementation.

FIG. 1 is a block diagram illustrating a side view of one example of a reflective structure 10 with transparent and semi-transparent transmission regions 50(1) and 50(2). Reflective structure 10 is an optical layer or film that diffusely reflects portions 62(1) and 64(1) of light 62 and 64, respectively, and transmits portions 62(2) and 64(2) of light 62 and 64, respectively, through transparent and semi-transparent transmission regions 50(1) and 50(2), respectively. By doing so, reflective structure 10 produces an image 72 that is only visible in transmission from the pattern of transparent and semi-transparent areas that correspond to regions 50(1) and 50(2), respectively. In reflection, reflective structure 10 provides a diffuse appearance where image 72 is not visible. As will be described in additional detail with reference to FIG. 6 below, reflective structure 10 may also be configured to reflect light with different diffuse characteristics (e.g., specular reflection) in selected portions to produce an image 74 in reflection from the pattern of different diffuse portions.

Reflective structure 10 includes a top transparent layer 20, a reflective layer 30, and a bottom transparent layer 40. Reflective structure 10 has a top surface 22 from top transparent layer 20 and a bottom surface 44 from bottom transparent layer 40 where each surface 22 and 44 has any suitable surface topology that is smooth, such as planar (shown in FIG. 1) or curved (not shown). Transparent transmission region 50(1) encompasses a portion 30(1) of reflective layer 30 and a portion 40(1) of bottom transparent layer 40. Semi-transparent transmission region 50(2) encompasses a portion 30(2) of reflective layer 30 and a portion 40(2) of bottom transparent layer 40.

Top transparent layer 20 is formed from any suitable flexible or rigid material or combination of materials that are at least partially transparent to visible light, such as polyester, polycarbonate, acrylic, glass, and fused silica. The material may take the form of a diffuser film of plastic with a textured surface or other suitable material. Top transparent layer 20 has opposed surfaces 22 and 24 (referred to as outer surface 22 and inner surface 24) where all or selected areas of inner surface 24 are textured (i.e., have a textured topology) as shown in the schematic examples of FIGS. 2, 3, and 7. These areas of inner surface 24 have a plurality of peaks and troughs of varying configurations and dimensions. The peaks and troughs may be fully randomized, partly-randomized, or periodically arranged according to any suitable configuration. The texturing may be achieved by embossing, etching, photopatterning, or applying any other suitable technique to all or selected areas of inner surface 24, for example.

Top transparent layer 20 has, for at least some selected portion of light 62 and 64, a refractive index referred to as $n_2$. Top transparent layer 20 transmits all or selected portions of light 62 and 64 to reflective layer 30. In some embodiments, top transparent layer 20 may be made birefringent.

Reflective layer 30 is disposed below top transparent layer 20 and represents any suitable layer configured to reflect selected portions 62(1) and 64(1) of light 62 and 64, respectively, received from top transparent layer 20.

Reflective layer 30 may be configured to reflect a selected proportion (e.g., 60%) of light 62 and 64 or selected wavelengths of light 62 and 64 and transmit a complementary, non-reflected proportion (e.g., 40%) of light 62(2) and 64(2). Reflective layer 30 may also be configured to reflect a selected proportion of wavelengths of light 62 and 64 across multiple wavebands of the visible spectrum and transmit the non-reflected light 62(2) and 64(2) of the multiple wavebands. Reflective layer 30 may further be configured to reflect selected wavelengths of light 62 and 64 in a selected waveband in or near the visible spectrum, such as red, green or blue, and to transmit other wavelengths of light 62 and 64.

Reflective layer 30 may be made relatively thin with respect to the length scale of the textured surface of inner surface 24. Reflective layer 30 is substantially conformal with inner surface 24 over all or selected portions of inner surface 24. The topology of reflective layer 30 generally corresponds to inner surface 24 in the portions of reflective layer 30 that are conformal with inner surface 24. The roughness of reflective layer 30 caused by the texture of inner surface 24 serves to diffuse reflected light 62(1) and 64(1) such that reflective layer 30 appears matte in reflection. The amount of diffusion of reflected light 62(1) and 64(1) may be controlled by the selection of a desired topology of inner surface 24 in combination with the selection of the optical properties of reflective layer 30.

Reflective layer 30 includes portions 30(1) and 30(2) along portions 24(1) and 24(2) of inner surface 24, respectively. Example implementations of reflective layer 30 are shown and described with reference to FIGS. 8A and 8B below. In one embodiment described with reference to FIG. 2 below, embodiments 30A(1) and 30A(2) of both portions 30(1) and 30(2) are substantially conformal with portions 24(1) and 24(2) of inner surface 24, respectively. In another embodiment described with reference to FIG. 3 below, an embodiment 30B(1) of portion 30(1) is substantially conformal with portion 24(1) of inner surface 24, but an embodiment 30B(2) of portion 30(2) is substantially non-conformal with portion 24(2) of inner surface 24 such that the topology of portion 30(2) differs from that of portion 30(1). The effects produced by these different embodiments will be described below.

Bottom transparent layer 40 represents a transparent dielectric formed from any suitable flexible or rigid material or combination of materials that are at least partially transparent to visible light and disposed below reflective layer 30. The material or materials of bottom transparent layer 40 may include the same or different materials as top transparent layer 20. Bottom transparent layer 40 has opposed surfaces 42 and 44 (referred to as inner surface 42 and outer surface 44). Inner surface 42 has a topology that generally corresponds to reflective layer 30.

Bottom transparent layer 40 has a portion 40(1) with an inner surface 42(1) along portion 30(1) of reflective layer 30 and an outer surface 44(1). Portion 40(1) has, for at least some selected portion of light 62(2) and for at least certain times, a refractive index also referred to as $n_2$ that is substantially equal to (i.e., matches) the refractive index $n_2$ of top transparent layer 20. The refractive indices of layer 20 and portion 40(1) may match for all or selected wavelengths, polarizations, and/or angles of incidence of light 62(2), for example, according to the structural configurations and compositions of layer 20, reflective layer portion 30(1), and portion 40(1). Where the refractive index of layers 20 and portion 40(1) match, light 62(2) that is transmitted through reflective layer portion 30(1) refracts at inner surface portion 42(1) such that it emerges from outer surface 44(1) without substantial deviation (i.e., at the same angle as the incident light 62). Thus, the transmitted light 62(2) is largely undeviated so that reflective structure 10 appears transparent in portion 40(1).

Bottom transparent layer 40 also has a portion 40(2) with an inner surface 42(2) along portion 30(2) of reflective layer 30 and an outer surface 44(2). Depending on the embodiment, portion 40(2) may have a refractive index that, for at least some selected portion of light 64(2) and for at least certain times, differs from the refractive index $n_2$ of top transparent layer 20 (e.g., the embodiment of FIG. 2 described below) or that is substantially equal to, at least during certain times, the refractive index $n_2$ of top transparent layer 20 (e.g., the embodiment of FIG. 3 described below). Portion 40(2) combines with reflective layer portion 30(2) to produce substantial deviation in light 64(2) that is transmitted through reflective layer portion 30(2) (i.e., at different angles from the incident light 64). The deviation of light 64(2) causes reflective structure 10 to appear semi-transparent in portion 40(2).

Figure 2:
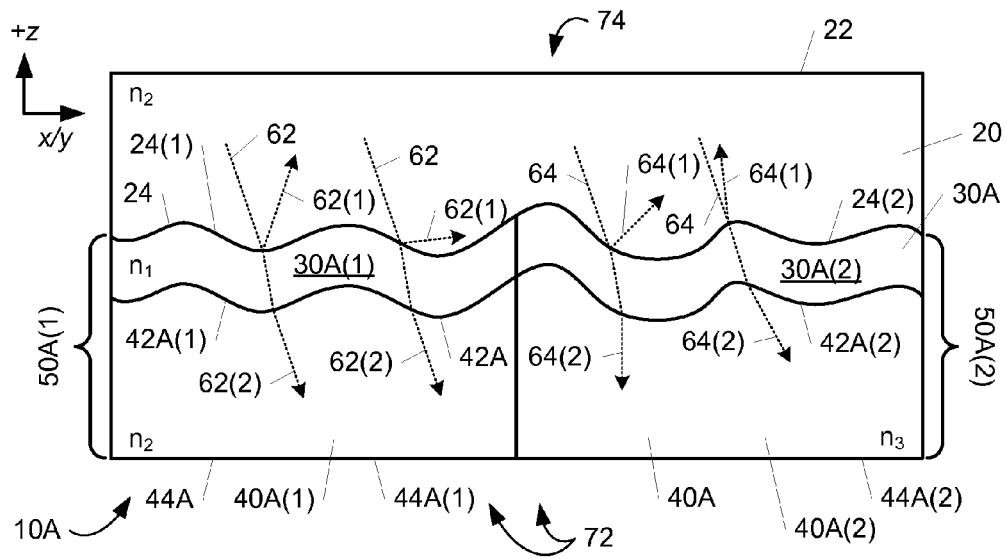
FIG. 2 is a schematic diagram illustrating a side view of one example of a reflective structure with transparent and semi-transparent transmission regions formed by different indices of refraction in a transparent layer.
Figure 3:
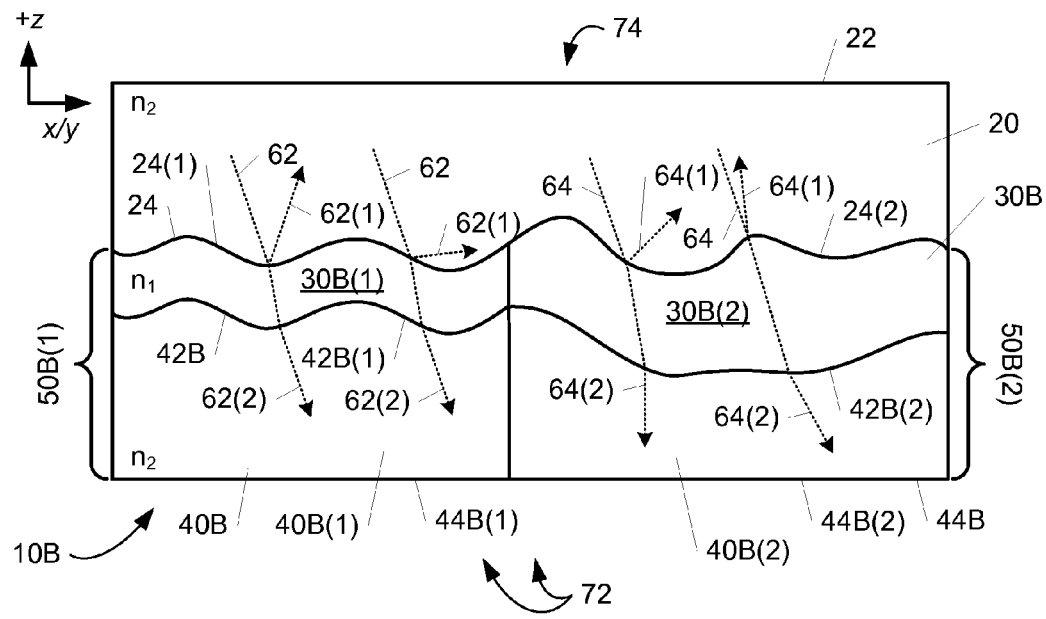
FIG. 3 is a schematic diagram illustrating a side view of one example of a reflective structure with transparent and semi-transparent transmission regions formed by a reflective layer with conformal and non-conformal portions.

Embodiments 40A and 40B of bottom transparent layer portion 40 are shown in FIGS. 2 and 3, respectively, and described in additional detail below.

In some embodiments, one or both of portions 40(1) and 40(2) may be made birefringent so that portions 40(1) and 40(2) may match or mismatch the refractive index of top transparent layer 20 depending on the polarization and angle of incidence of light 62 and 64. If top transparent layer 20 is also birefringent, then the refractive indices of top transparent layer 20 and portions 40(1) and/or 40(2) could be made to match for selected polarizations and angles of incidence of light 62 and 64 so that image 72 disappears under certain lighting conditions.

In some embodiments, the refractive indices in one or both of portions 40(1) and 40(2) may be made electrically switchable (i.e., active) to selectively match or mismatch the refractive index of top transparent layer 20 to vary the transparent and/or semi-transparent areas over time. For example, either or both of portions 40(1) and 40(2) may form a liquid crystal (LC) layer where an applied voltage re-orients the alignment of the LC to change the refractive index seen by light 62(2) and/or 64(2). The contrast of image 72 for active portions 40(1) and/or 40(2) may be enhanced by selecting a suitable configuration of texture, materials, and LC alignment. The refractive index of the liquid crystal may further depend on the angle of incidence and polarization of light 62(2) and/or 64(2). Reflective layer 30 may be used as one electrode for applying a voltage to the LC in some embodiments. The other electrode may be indium tin oxide (ITO) or another suitable conductor. The other electrode may be patterned to create unswitched areas of some or all of portions 40(1) and/or 40(2). In other examples, other electro-optic effects, such as electrophoretic motion of nanoparticles in a fluid, may also be used to change the refractive indices of one or both of portions 40(1) and 40(2).

In further embodiments, top transparent layer 20 may also be made into a switchable layer, a birefringent top transparent layer 20 may be combined with a top and/or bottom switchable layers that could be bistable, and/or top transparent layer 20 may be divided into portions having different refractive indices to operate similar to the operation of bottom transparent layer 40 in transmission.

Transparent transmission region 50(1) includes reflective layer portion 30(1) and bottom transparent layer portion 40(1). Reflective layer portion 30(1) receives light 62 from top transparent layer 20 and transmits light 62(2) through to bottom transparent layer portion 40(1). The matching refractive indices of portion 40(1) and top transparent layer 20 cause light 62(2) to be transmitted through reflective structure 10 largely undeviated to produce a transparent area that forms a part of image 72.

Semi-transparent transmission region 50(2) includes reflective layer portion 30(2) and bottom transparent layer portion 40(2). Reflective layer portion 30(2) receives light 64 from top transparent layer 20 and transmits light 64(2) through to bottom transparent layer portion 40(2). The structural arrangement of reflective layer portion 30(2) and bottom transparent layer portion 40(2) cause light 64(2) to be transmitted through reflective structure 10 with substantial deviation to produce a semi-transparent area that forms a part of image 72. The deviation by reflective layer portion 30(2) and bottom transparent layer portion 40(2) is configured to be substantial enough to provide a perceptible visible contrast with transparent transmission region 50(1) under desired lighting conditions.

The type of deviation of light 64(2) caused by reflective layer portion 30(2) and bottom transparent layer portion 40(2) may be selected using any suitable combination of the texture of top transparent layer inner surface 24(2), the amount of conformity of reflective layer portion 30(2), and the refractive indices of top transparent layer 20 and bottom transparent layer portion 40(2). For example, the type of deviation of light 64(2) include diffusion, lensing, diffraction, and/or controlled scatter angles to result in region 50(2) being semi-transparent.

Using light 62(2) and 64(2), regions 50(1) and 50(2) produce image 72 such that image 72 is only visible in transmission from the pattern of transparent and semi-transparent areas that correspond to regions 50(1) and 50(2), respectively. In reflection, regions 50(1) and 50(2) produce a diffuse appearance where image 72 is not visible.

In other embodiments, other regions 50 may be added to the embodiment of FIG. 1 to produce other suitable transparent or semi-transparent areas that may differ from the transparent and semi-transparent areas produced by regions 50(1) and 50(2), respectively.

Embodiments 50A(1) and 50A(2) of regions 50(1) and 50(2) are shown in FIG. 2 and described in additional detail below. Similarly, embodiments 50B(1) and 50B(2) of regions 50(1) and 50(2) are shown in FIG. 3 and described in additional detail below.

FIG. 2 is a schematic diagram illustrating a side view of one example of a reflective structure 1 OA with transparent and semi-transparent transmission regions 50A(1) and 50A(2) formed by different indices of refraction in different portions 40A(1) and 40A(2) of a bottom transparent layer 40A.

In reflective structure 10A, a reflective layer 30A includes portions 30A(1) and 30A(2) that are each substantially conformal with portions 24(1) and 24(2) of inner surface 24, respectively. Thus, portions 30A(1) and 30A(2) form a continuous conformal layer in the example of FIG. 2.

Bottom transparent layer portion 40A(1) has an inner surface 42A(1) along portion 30A(1) of reflective layer 30A. Bottom transparent layer portion 40A(1) also has, for at least some selected portion of light 62(2) and for at least certain times, a refractive index $n_2$ that is substantially equal to (i.e., matches) the refractive index $n_2$ of top transparent layer 20. Light 62(2) that is transmitted through reflective layer portion 30A(1) refracts at inner surface portion 42A(1) such that it emerges from outer surface 44A(1) without substantial deviation (i.e., at the same angle as the incident light 62). Thus, the transmitted light 62(2) is largely undeviated so that reflective structure 10A appears transparent in portion 40A(1).

Bottom transparent layer portion 40A(2) has an inner surface 42A(2) along portion 30A(2) of reflective layer 30A. Bottom transparent layer portion 40A(2) also has, for at least some selected portion of light 64(2) and for at least certain times, a refractive index $n_3$ that differs from the refractive index $n_2$ of top transparent layer 20. Light 64(2) that is transmitted through reflective layer portion 30A(2) refracts at inner surface portion 42A(2) such that it emerges from outer surface 44A(2) with substantial deviation (i.e., at a different angle from the incident light 64). The deviation of light 64(2) by portion 40A(2) causes reflective structure 10A to appear semi-transparent (i.e., diffuse) in portion 40A(2).

Bottom transparent layer portions 40A(1) and 40A(2) may be made by any suitable processes such as photopatterning materials (e.g., polymers) with different refractive indices or applying selective processing to a single material to pattern the refractive indices. For example, many polymers change their refractive index depending on the degree of polymerization so that changing the process temperature or UV curing dose may be used. Laser processing may also be used to modify the refractive index, which may enable rapid customization during manufacture. Bottom transparent layer portions 40A(1) and/or 40A(2) may also be made electrically switchable (i.e., active) to selectively match or mismatch the refractive index of top transparent layer 20 to vary the transparent and/or semi-transparent areas over time.

In the example of FIG. 2, transparent transmission region 50A(1) includes reflective layer portion 30A(1) and bottom transparent layer portion 40A(1). Reflective layer portion 30A(1) receives light 62 from top transparent layer 20 and transmits light 62(2) through to bottom transparent layer portion 40A(1). The matching refractive indices of portion 40A(1) and top transparent layer 20 cause light 62(2) to be transmitted through reflective structure 10A largely undeviated to produce a transparent area that forms a part of image 72.

Likewise, semi-transparent transmission region 50A(2) includes reflective layer portion 30A(2) and bottom transparent layer portion 40A(2). Reflective layer portion 30A(2) receives light 64 from top transparent layer 20 and transmits light 64(2) through to bottom transparent layer portion 40A(2). The mismatching refractive indices of portion 40A(2) and top transparent layer 20 cause light 64(2) to be transmitted through reflective structure 10A with substantial deviation to produce a semi-transparent (i.e., diffuse) area that forms a part of image 72. The deviation by bottom transparent layer portion 40A(2) is configured to be substantial enough to provide a perceptible visible contrast with transparent transmission region 50A(1) under desired lighting conditions.

Using light 62(2) and 64(2), regions 50A(1) and 50A(2) produce image 72 such that image 72 is only visible in transmission from the pattern of transparent and semi-transparent areas that correspond to regions 50A(1) and 50A(2), respectively. In reflection, regions 50A(1) and 50A(2) produce a diffuse appearance where image 72 is not visible.

FIG. 3 is a schematic diagram illustrating a side view of one example of a reflective structure 10B with transparent and semi-transparent transmission regions 50B(1) and 50B(2) formed by a reflective layer 30B with a conformal portion 30B(1) and a non-conformal portion 30B(2).

In reflective structure 10B, portion 30B(1) is substantially conformal with portion 24(1) of inner surface 24, and portion 30B(2) is substantially non-conformal with portion 24(2) of inner surface 24.

Bottom transparent layer 40B includes a portion 40B(1) with an inner surface 42B(1) along portion 30B(1) of reflective layer 30B and a portion 40B(2) with an inner surface 42B(2) along portion 30B(2) of reflective layer 30B. Each portion 40B(1) and 40B(2) has the same refractive index $n_2$. Bottom transparent layer portion 40B(1) operates the same way as bottom transparent layer portion 40A(1) in FIG. 2 to produce light 62(2) that is largely undeviated so that reflective structure 10B appears transparent in portion 40B(1).

Because portion 30B(2) is non-conformal, however, the interfaces formed by inner surface 24(2) and inner surface 42B(2) with portion 30B(2) are no longer parallel. As a result, the refraction of light 64(2) in portion 40B(2) will result in some scatter such that it emerges from outer surface 44B(2) with substantial deviation (i.e., at a different angle from the incident light 64). The deviation of light 64(2) from the non-parallel interfaces causes reflective structure 10B to appear semi-transparent (i.e., diffuse) in portion 40B(2).

Bottom transparent layer portions 40B(1) and/or 40B(2) may also be made electrically switchable (i.e., active) to selectively match or mismatch the refractive index of top transparent layer 20 to vary the transparent and/or semi-transparent areas over time.

In the example of FIG. 3, transparent transmission region 50B(1) includes reflective layer portion 30B(1) and bottom transparent layer portion 40B(1). Reflective layer portion 30B(1) receives light 62 from top transparent layer 20 and transmits light 62(2) through to bottom transparent layer portion 40B(1). The matching refractive indices of portion 40B(1) and top transparent layer 20 cause light 62(2) to be transmitted through reflective structure 10B largely undeviated to produce a transparent area that forms a part of image 72.

Likewise, semi-transparent transmission region 50B(2) includes reflective layer portion 30B(2) and bottom transparent layer portion 40B(2). Reflective layer portion 30B(2) receives light 64 from top transparent layer 20 and transmits light 64(2) through to bottom transparent layer portion 40B(2). The non-parallel interfaces of top transparent layer 20 and portion 40B(2) with reflective layer portion 30B(2) cause light 64(2) to be transmitted through reflective structure 10B with substantial deviation to produce a semi-transparent (i.e., diffuse) area that forms a part of image 72. The deviation from the non-parallel interfaces is configured to be substantial enough to provide a perceptible visible contrast with transparent transmission region 50B(1) under desired lighting conditions.

Using light 62(2) and 64(2), regions 50B(1) and 50B(2) produce image 72 such that image 72 is only visible in transmission from the pattern of transparent and semi-transparent areas that correspond to regions 50B(1) and 50B(2), respectively. In reflection, regions 50B(1) and 50B(2) produce a reflected image at surface 22. If illuminated from the bottom (i.e., from under surface 44B), then a reflection image would be also formed at surface 44B. These two reflection images may be different depending on the topology of the surfaces 42B and 24. If illuminated from the bottom, then a transmission image would also be formed at surface 22.

Figures 4A, 4B:
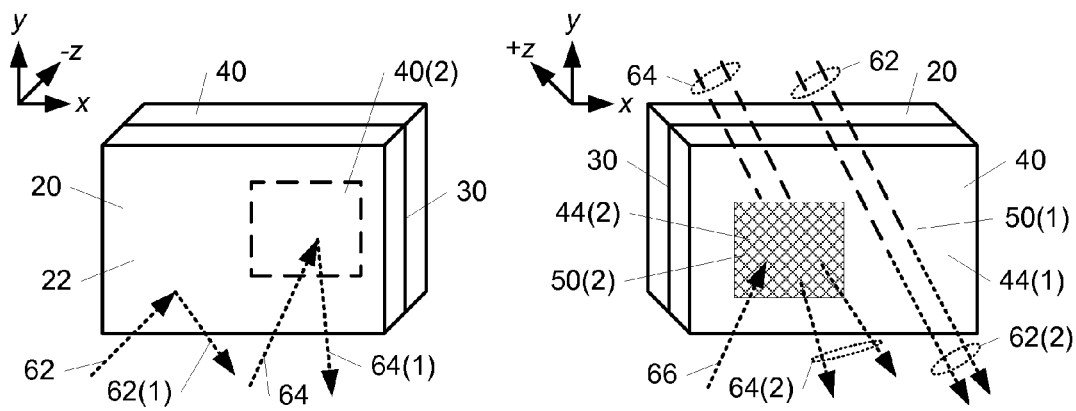
FIGS. 4A-4B are schematic diagrams illustrating top and bottom perspective views of an example a reflective structure with transparent and semi-transparent transmission regions.

FIGS. 4A-4B are schematic diagrams illustrating top and bottom perspective views of an example reflective structure 10 with transparent and semi-transparent transmission regions 50(1) and 50(2). As shown in FIG. 4A, reflective structure 10 provides deviated reflection of light 62(1) and 64(1) such that a matte appearance is produced in reflection. Reflective structure 10 also provides undeviated transmission of light 62(2) such that outer surface portion 44(1) appears transparent in transmission. Reflective structure 10 further provides deviated transmission of light 64(2) such that outer surface portion 44(2) appears semi-transparent in transmission.

FIG. 5 is a schematic diagram illustrating a bottom perspective view of one example of reflective structure 10 with transparent and semi-transparent transmission regions 50(1) and 50(2) where semi-transparent transmission region 50(2) is electrically switchable. In the example of FIG. 5, portion 40(2) includes an LC layer with a refractive index that varies with an applied voltage as described above. The LC layer is shown switched to cause the refractive index of portion 40(2) to match the refractive index of top transparent layer 20 to switch semi-transparent transmission region 50(2) from a semi-transparent appearance (as shown in FIG. 4B) to a transparent appearance as indicated by the lack of deviation of light 64(2) shown in FIG. 5.

FIG. 6 is a schematic diagram illustrating a top perspective view of one example of reflective structure 10 with a pattern 80 formed by reflection areas 82 and 84 with different diffuse characteristics. The texture of inner surface 24 of top transparent layer 20 (shown in FIG. 7) may be patterned to produce not only the diffuse reflection areas 82 that provide one type of diffuse appearance in reflection but also reflection areas 84 that provide another type of diffuse or specular appearance in reflection. As shown in FIG. 7, inner surface 24 includes a smooth portion 24(3) to cause light 68(1) to be spectrally reflected in reflection area 84. The combination of different diffuse reflection areas 82 and 84 produces pattern 80 on outer surface 22 with sufficient contrast between areas 82 and 84 such that pattern 80 is visible in reflection.

FIGS. 8A-8B are schematic diagrams illustrating side views of examples 30A and 30B of reflective layer 30. In FIG. 8A, reflective layer 30A includes a single layer 92 that may be thin metallic layer so that it acts as a partial broadband reflector (e.g., 20 nm of silver), a layer of liquid crystal reactive mesogens where the anisotropic molecules for a twisted structure and the pitch of the structure causes selective reflection of wavelengths that are close to the pitch, or other suitable single layer. In FIG. 8B, reflective layer 30B includes any suitable number of layers 94(1)-94(N) such as a multilayer dielectric system designed to reflect a single color, a polymer matrix with embedded microparticles that form a multilayer shell structure so that they give a selective reflection, or any other suitable multilayer system.

The above examples of reflective structure 10 may be used in a wide variety of applications including projection screens, anti-counterfeiting structures, window films, retail displays, product casings, indicators, and other suitable decorative effects and finishes.

What is claimed is:

1. A reflective structure with transparent and semi-transparent transmission regions and comprising:
   a first transparent layer having an inner surface, the inner surface including a textured area;
   a reflective layer disposed below the first transparent layer and having a first portion that is substantially conformal with at least a first portion of the textured area; and
   a second transparent layer disposed below the reflective layer and having a first portion with a refractive index that is substantially equal to a refractive index of the first transparent layer;
   wherein the reflective layer is to reflect a first portion and of light from the first transparent layer,
   wherein the transparent transmission region encompasses the first portion of the reflective layer and the first portion of the second transparent layer and is configured to transmit a second portion of the light from the first transparent layer without substantial deviation, and
   wherein the semi-transparent transmission region encompasses a second portion of the reflective layer and a second portion of the second transparent layer and is configured to transmit a third portion of the light from the first transparent layer with substantial deviation.

2. The reflective structure of claim 1 wherein the second portion of the second transparent layer has a refractive index that differs from the refractive index of the first transparent layer.

3. The reflective structure of claim 2 wherein the second portion of the reflective layer is substantially conformal with at least a second portion of the textured area, and wherein the second portion of the second transparent layer has an inner surface along the second portion of the reflective layer.

4. The reflective structure of claim 1 wherein the second portion of the reflective layer is substantially non-conformal with at least a second portion of the textured area.

5. The reflective structure of claim 1 wherein the second portion of the second transparent layer has a refractive index that is equal to the refractive index of the first transparent layer.

6. The reflective structure of claim 1 wherein the second portion of the second transparent layer is electrically switchable to cause the refractive index to selectively match or mismatch the refractive index of the first transparent layer.

7. The reflective structure of claim 1 wherein the inner surface of the first transparent layer includes a second area that combines with the textured area to produce a pattern that is visible in reflection.

8. The reflective structure of claim 1 wherein the reflective layer includes a single layer.

9. The reflective structure of claim 1 wherein the reflective layer includes a plurality of layers.

* * * * *

UNITED STATES PATENT AND TRADEMARK OFFICE
CERTIFICATE OF CORRECTION

PATENT NO. : 9,519,199 B2  
APPLICATION NO. : 14/421287  
DATED : December 13, 2016  
INVENTOR(S) : Stephen Kitson et al.

Page 1 of 1

It is certified that error appears in the above-identified patent and that said Letters Patent is hereby corrected as shown below:

In the Specification

In Column 1, Line 4 approx., before BACKGROUND, insert
--CROSS-REFERENCE TO RELATED APPLICATION
This application is a U.S. National Stage Application of and claims priority to
International Patent Application No. PCT/US2012/057644, filed on September 27, 2012, and
entitled "REFLECTIVE STRUCTURE WITH TRANSPARENT AND SEMI-TRANSPARENT
TRANSMISSION REGIONS--.

Signed and Sealed this
Twenty-fifth Day of April, 2017

Michelle K. Lee
*Director of the United States Patent and Trademark Office*